(12) United States Patent
Ishisaka

(10) Patent No.: US 7,630,920 B2
(45) Date of Patent: Dec. 8, 2009

(54) ELECTRONIC BIDDING METHOD FOR RECEIVING A BIDDING FORM FROM A BIDDER FOR A SUPPLIED ITEM VIA A VIRTUAL SERVER SECURED UNTIL A BIDDING DUE DATE

(75) Inventor: Akira Ishisaka, Kawasaki (JP)

(73) Assignee: Fujitsu Limited, Kawasaki-Shi (JP)

( * ) Notice: Subject to any disclaimer, the term of this patent is extended or adjusted under 35 U.S.C. 154(b) by 1253 days.

(21) Appl. No.: 10/268,680

(22) Filed: Oct. 11, 2002

(65) Prior Publication Data

US 2003/0158808 A1 Aug. 21, 2003

(30) Foreign Application Priority Data

Feb. 19, 2002 (JP) .............................. 2002-042070

(51) Int. Cl.
*G06Q 30/00* (2006.01)
*G06F 17/30* (2006.01)

(52) U.S. Cl. .............................. 705/26; 705/1; 705/27; 705/37

(58) Field of Classification Search ...................... 705/1, 705/26–27, 37, 50, 64–79
See application file for complete search history.

(56) References Cited

U.S. PATENT DOCUMENTS

| 6,058,417 | A  * | 5/2000  | Hess et al. ................. | 709/219  |
| 6,363,365 | B1 * | 3/2002  | Kou ............................ | 705/64   |
| 6,629,082 | B1 * | 9/2003  | Hambrecht et al. ....... | 705/36 R |
| 6,647,373 | B1 * | 11/2003 | Carlton-Foss ............... | 705/37   |
| 6,704,713 | B1 * | 3/2004  | Brett .......................... | 705/37   |
| 2001/0056396 | A1 * | 12/2001 | Goino ........................ | 705/37 |
| 2002/0004900 | A1 * | 1/2002  | Patel ......................... | 713/155 |
| 2002/0046293 | A1 * | 4/2002  | Kabata et al. ............... | 709/245 |
| 2002/0128925 | A1 * | 9/2002  | Angeles ..................... | 705/26 |
| 2002/0147655 | A1 * | 10/2002 | Say ............................ | 705/26 |

(Continued)

FOREIGN PATENT DOCUMENTS

EP 1 102 473 5/2001

(Continued)

OTHER PUBLICATIONS

"VeriSign Reports Fourth Quarter and Fiscal 2000 Results. Strong Results and Momentum Position Company as the Internet's Most Trusted Utility". Mountain View, CA, Jan. 24, 2001 [recovered from EIC/Dialog search on Jul. 16, 2009].*

(Continued)

*Primary Examiner*—Matthew S Gart
*Assistant Examiner*—William J. Allen
(74) *Attorney, Agent, or Firm*—Staas & Halsey LLP

(57) ABSTRACT

In an electronic bidding method used by a bidder to bid for a bid item supplied on a network, a virtual server is generated for each newly supplied bid item when a supplier makes an entry of the bid item for a bidding. The virtual server is secured until a bidding due date of the supplied bid item. Bidding forms transmitted from bidders for the bid item can be received via the virtual server until the bidding due date, and can be managed by the virtual server.

7 Claims, 15 Drawing Sheets

U.S. PATENT DOCUMENTS

| | | | |
|---|---|---|---|
| 2003/0046216 A1* | 3/2003 | Kaplan | 705/37 |
| 2003/0154398 A1* | 8/2003 | Eaton et al. | 713/201 |
| 2003/0200156 A1* | 10/2003 | Roseman et al. | 705/27 |
| 2004/0128224 A1* | 7/2004 | Dabney et al. | 705/37 |

FOREIGN PATENT DOCUMENTS

| | | |
|---|---|---|
| JP | 2000-029973 | 1/2000 |
| JP | 2001-022875 | 1/2001 |
| JP | 2001-211306 | 8/2001 |
| JP | 2001-344368 | 12/2001 |

OTHER PUBLICATIONS

Microsoft Internet Developer, Mar. 2000, No. 18, pp. 73-81.

Japanese Office Action of JP Application No. 2002-042070 mailed Jan. 24, 2006.

* cited by examiner

FIG.13

SUPPLY

▲ BID PARTICIPATION
△ BIDDING
▲ BID-OPENING RESULT

DATE xx/xx/xx xx:xx

DISPLAY SWITCH ▲ ONLY ITEMS BEING BID FOR   ALL ITEMS INCLUDING BID-OPENED ITEMS

| IDENTIFICATION CODE | SUPPLIED ITEM NAME | BIDDING DUE DATE | SUPPLY DEPARTMENT | STATUS | POINTS OF CONCERN |
|---|---|---|---|---|---|
| xx01 | ITEM 1 | 2001/12/11 | ○○○ DEP. | BEING BID FOR | ABSENT |
| xx02 | ITEM 2 | 2000/7/11 | △△△ DEP. | BID-OPENED | PRESENT |
| xx03 | ITEM 3 | 2002/1/11 | ○○○ DEP. | BEING BID FOR | PRESENT |
| xx04 | ITEM 4 | 2001/12/11 | ○△○ DEP. | BEING BID FOR | PRESENT |
| xx05 | ITEM 5 | 2001/12/11 | ○○○ DEP. | BEING BID FOR | PRESENT |
| xx06 | ITEM 6 | 2002/3/11 | △○△ DEP. | BEING BID FOR | PRESENT |
| xx07 | ITEM 7 | 2002/2/21 | ○○○ DEP. | BEING BID FOR | PRESENT |
| xx08 | ITEM 8 | 2000/8/31 | △△△ DEP. | BID-OPENED | PRESENT |
| xx09 | ITEM 9 | 2000/6/11 | ○○○ DEP. | BID-OPENED | ABSENT |
| xx10 | ITEM 10 | 2001/12/11 | ○○○ DEP. | BEING BID FOR | ABSENT |

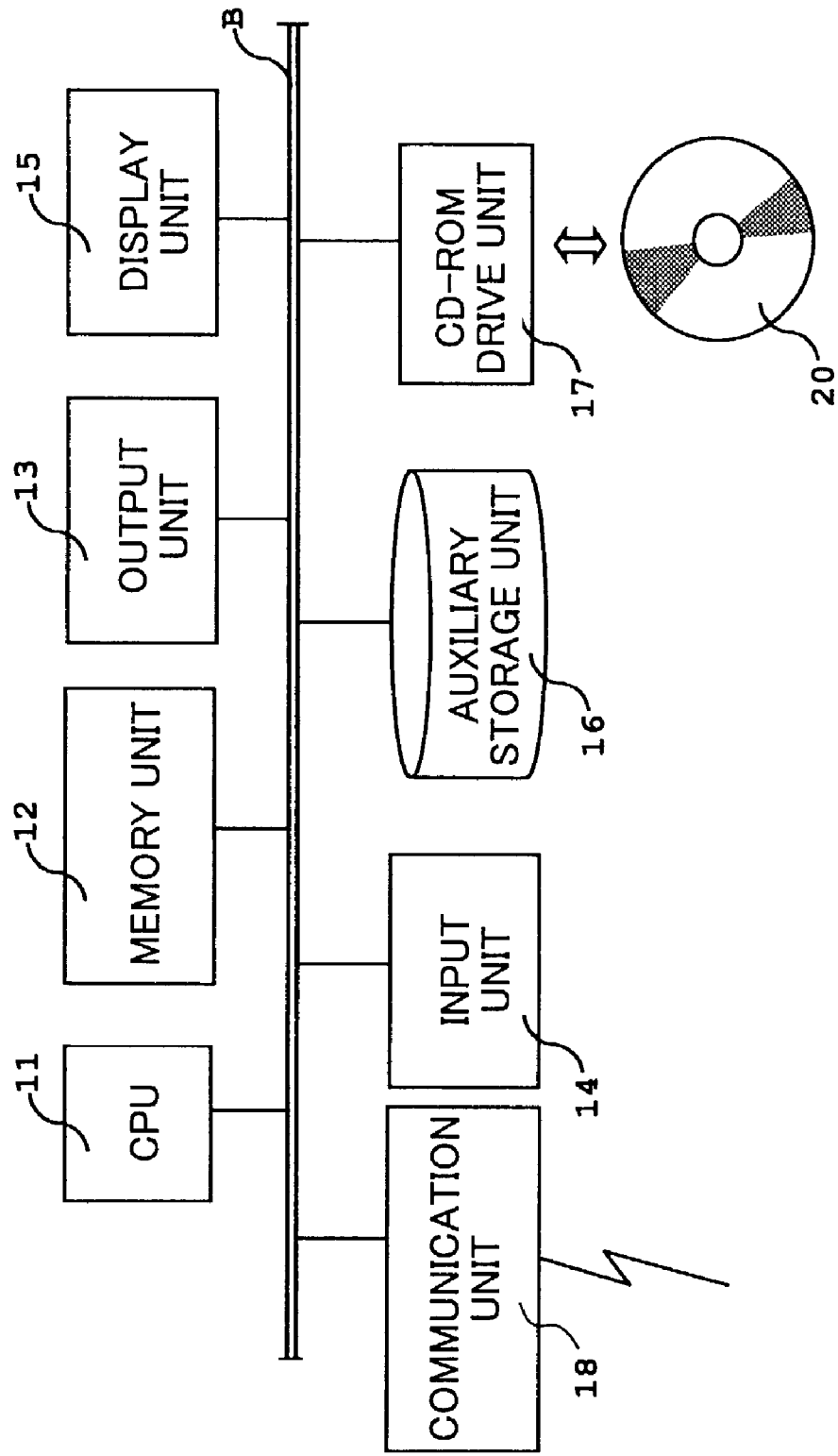

ELECTRONIC BIDDING METHOD FOR RECEIVING A BIDDING FORM FROM A BIDDER FOR A SUPPLIED ITEM VIA A VIRTUAL SERVER SECURED UNTIL A BIDDING DUE DATE

BACKGROUND OF THE INVENTION

1. Field of the Invention

The present invention generally relates to an electronic bidding method, and more particularly, to an electronic bidding method for bidding for a supplied bid item laid open via a network.

2. Description of the Related Art

Recently, for the purpose of conducting a bidding and a bid opening equitably, there has been introduced an electronic bidding system in which a bidding is managed via a network by using a server computer.

However, the conventional electronic bidding system has the following problems.

In such electronic bidding system, a "bid-closing function" and a "forbiddance of bid opening before due date" need considerations as restrictions on time factors for a bidding; thus, a method has been studied in which the time restrictions are managed by using electronic keys. Accordingly, there have been discussions over functions of keys for managing and controlling time. On the other hand, in a "public key infrastructure (PKI)" used for providing security for electronic commerce, keys are not related to a concept of time; thus, time cannot be controlled therein; therefore, in constructing an electronic bidding system, keys having new functions have had to be designed and brought into operation. As such keys, a "time key" and a "common key" may be brought into operation; however, the "time key" requires new operational designs for authentication by a third-party organization, and the "common key" requires new operational designs for delivering and synchronizing the keys. At this point, in an electronic bidding system, time restrictions (such as a bidding due date) are set for each bid item; accordingly, when each bid item requires procedures for the third-party organization authentication, and operations for delivering and synchronizing the keys, these procedures are expected to become a vital part in operating an electronic bidding system; therefore, a more simple method has been needed to be designed.

SUMMARY OF THE INVENTION

It is a general object of the present invention to provide an improved and useful electronic bidding method in which the above-mentioned problems are eliminated.

A more specific object of the present invention is to provide an electronic bidding method which enables a bidding based on time without using a key specially prepared for the bidding.

In order to achieve the above-mentioned objects, there is provided according to one aspect of the present invention an electronic bidding method for bidding for a supplied item laid open via a network, the method comprising a virtual server securing step of generating a virtual server corresponding to a newly supplied item according to an entry of the supplied item by a supplier, and securing the virtual server until a bidding due date of the supplied item, and a bidding form managing step of enabling a bidding form transmitted from a bidder for the supplied item to be received via the corresponding virtual server until the bidding due date, and managing the received bidding form.

According to the present invention, a bidding form is receivable until a bidding due date of each supplied item via a corresponding virtual server secured (kept valid) until the bidding due date, and a bidding form for each supplied item can be prevented from being received after the bidding due date. This virtual server configuration can be realized without changing a conventional security environment based on a certificate using a public key. Thus, time management of a bidding becomes possible based on a bidding due date.

Additionally, in the electronic bidding method according to the present invention, the virtual server securing step may include a certificate obtaining step of obtaining a certificate certifying the bidder from a third-party certification organization authenticating the bidder upon receiving a bid participation application form from the bidder for the supplied item, the method further comprising an application form verifying step of verifying a signature of the bidder by decoding the encoded bid participation application form by using a public key included in the certificate, a valid duration changing step of changing a valid duration of the certificate to a bid-opening date of the supplied item, and a bidder certificate managing step of authenticating and managing the bidder for each supplied item until the bid-opening date by managing the certificate as a bidder certificate.

According to the present invention, the valid duration of a certificate certifying a bidder issued by a third-party certification organization is changed to a bid-opening date of a supplied item, and the certificate is managed as a bidder certificate; thus, time management of the bidder certificate becomes possible based on the bid-opening date.

Additionally, the electronic bidding method according to the present invention may further comprise an authenticating step of authenticating the bidder for the supplied item subjected to a bid opening on the bid-opening date, according to the bidder certificate managed by the bidder certificate managing step, and a bid-opening step of performing the bid opening with respect to the bidding form transmitted from the bidder, according to a result of the authentication performed by the authenticating step.

According to the present invention, bidders bidding for a supplied item are authenticated on a bid-opening date designated for the supplied item; this increases a reliability of a bidding form transmitted from the bidder.

Additionally, in the electronic bidding method according to the present invention, the bidding form managing step may include a bidding form verifying step of verifying the signature of the bidder creating the bidding form, by decoding the encoded bidding form by using a public key included in the bidder certificate.

Additionally, in the electronic bidding method according to the present invention, the bidding form may be an electronic document applied with an electronic signature and further encoded, and the bidding form managing step may manage the verified signature by attaching the verified signature to the encoded bidding form.

According to the present invention, the electronic signature proves that the bidding form is a bidding form transmitted from the bidder. Additionally, since the bidding form per se is encoded, the bidding form can be managed with contents thereof being secured.

In order to achieve the above-mentioned objects, there is also provided according to another aspect of the present invention a program and a recording medium storing the program for causing a computer to perform the steps of the above-mentioned electronic bidding method.

Other objects, features and advantages of the present invention will become more apparent from the following detailed description when read in conjunction with the accompanying drawings.

BRIEF DESCRIPTION OF THE DRAWINGS

FIG. 13 is an illustration of an example of a bid item selection screen for bidding;

FIG. 15 is a block diagram of a hardware configuration of the electronic bidding/bid-opening system according to the embodiment of the present invention.

DETAILED DESCRIPTION OF THE PREFERRED EMBODIMENTS

A description will now be given, with reference to the drawings, of embodiments according to the present invention.

Figure 1:
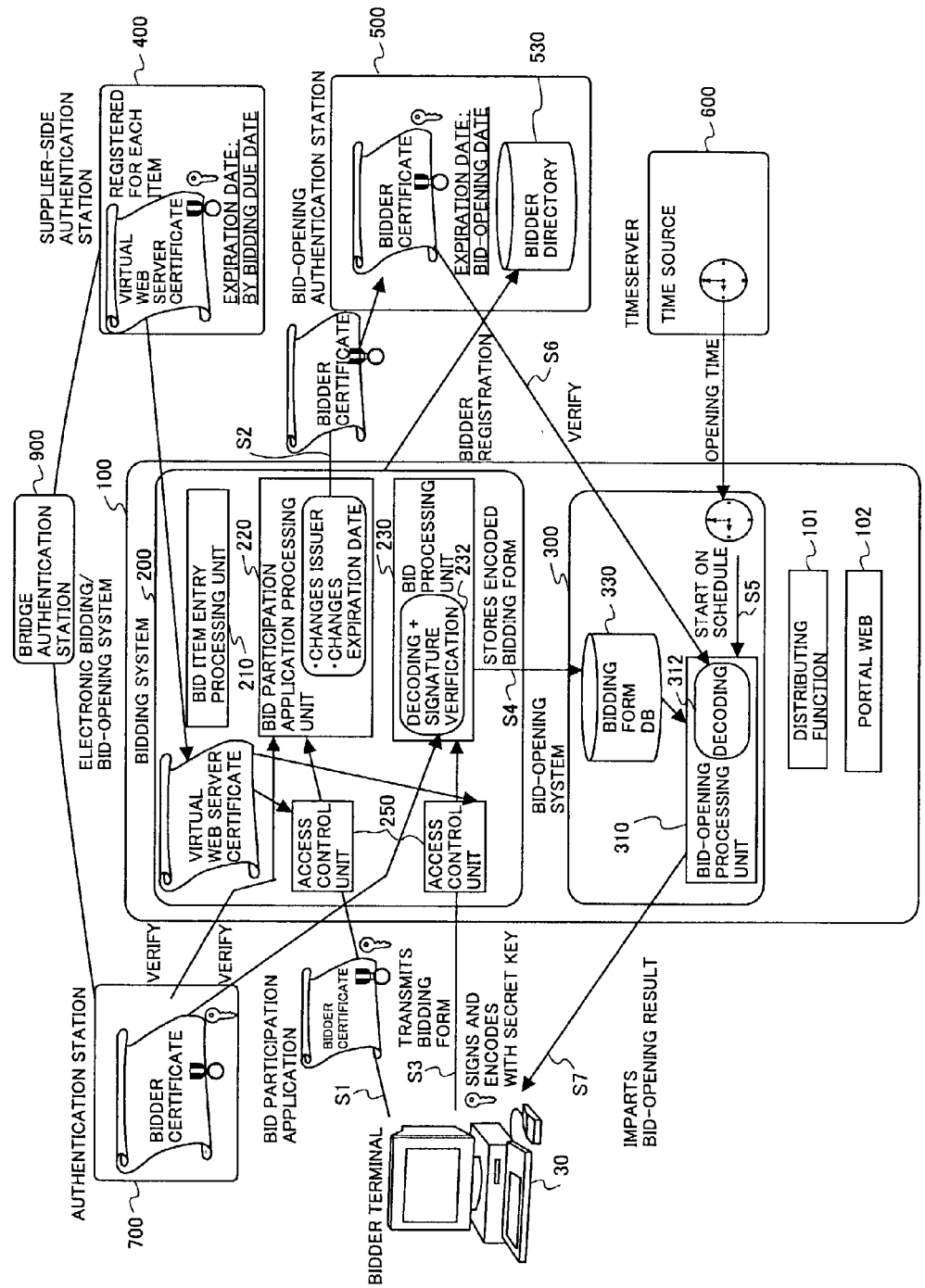
FIG. 1 is a diagram illustrating a configuration of an electronic bidding/bid-opening system according to an embodiment of the present invention.

FIG. 1 is a diagram illustrating a configuration of an electronic bidding/bid-opening system adopting an electronic bidding method and a bid-opening method according to an embodiment of the present invention. In FIG. 1, an electronic bidding/bid-opening system 100 is a server computer, and connects to a supplier-side authentication station 400, a bid-opening authentication station 500 and a timeserver 600, via networks (not shown in the figure). A bridge authentication station 900 is connected to the supplier-side authentication station 400 and an authentication station 700, and performs a hereinafter-described bridge authentication. The electronic bidding/bid-opening system 100 is also connected with a bidder terminal 30 via a network. Processes necessary for a bidding are performed between the bidder terminal 30 and the electronic bidding/bid-opening system 100.

The electronic bidding/bid-opening system 100 comprises a bidding system 200 and a bid-opening system 300. The bidding system 200 manages a bidding issue from the bidder terminal 30. The bid-opening system 300 performs a bid-opening process according to an opening time notification from the timeserver 600.

The bidding system 200 comprises a distributing function 101, a portal web 102, a bid item entry processing unit 210 (which composes virtual server securing means), a bid participation application processing unit 220, a bid processing unit 230, and an access control unit 250. The distributing function 101 performs a distribution to virtual web servers. The portal web 102 provides an integrated screen. The bid participation application processing unit 220 changes an issuer and an expiration date. The bid processing unit 230 verifies and keeps a bidding form. The access control unit 250 controls an access by SSL (Secure Socket Layer).

According to an entry of a new bid item supplied from a supplier, the bid item entry processing unit 210 generates a virtual web server accessed by SSL, and causes the supplier-side authentication station 400 to authenticate the virtual web server. The bid participation application processing unit 220 causes the bid-opening authentication station 500 to manage a "bidder certificate authenticated by a third-party certification organization (the hereinafter-described authentication station 700)" obtained from a bidder, and changes a valid duration of the bidder certificate to start from a bid-opening date of a bid item. Upon receiving the encoded bidding form from the bidder, the bid processing unit 230 decodes the encoded bidding form so as to verify a signature of the bidder, and manages and keeps the original encoded bidding form.

When a predetermined bid-opening date comes for each bid item, the bid-opening system 300 decodes the kept bidding form with a public key of the bidder managed by the bid-opening authentication station 500 so as to verify the signature; then, after performing a predetermined bid-opening process, the bid-opening system 300 notifies the bidder of a result of the bid opening.

The supplier-side authentication station 400 is a computer system managing a virtual web server certificate for authenticating a virtual web server generated for each bid item, and is provided at an operator's side operating the electronic bidding/bid-opening system 100, for example.

The bid-opening authentication station 500 is a computer system managing the bidder certificate for authenticating the bidder upon the bid opening, and is provided at the operator's side operating the electronic bidding/bid-opening system 100, for example.

The timeserver 600 is a computer system servicing a time notification for a timer adjustment so as to keep accurate a bid-opening schedule managed by the bid-opening system 300, and is provided at the operator's side operating the electronic bidding/bid-opening system 100, for example.

Figure 2:
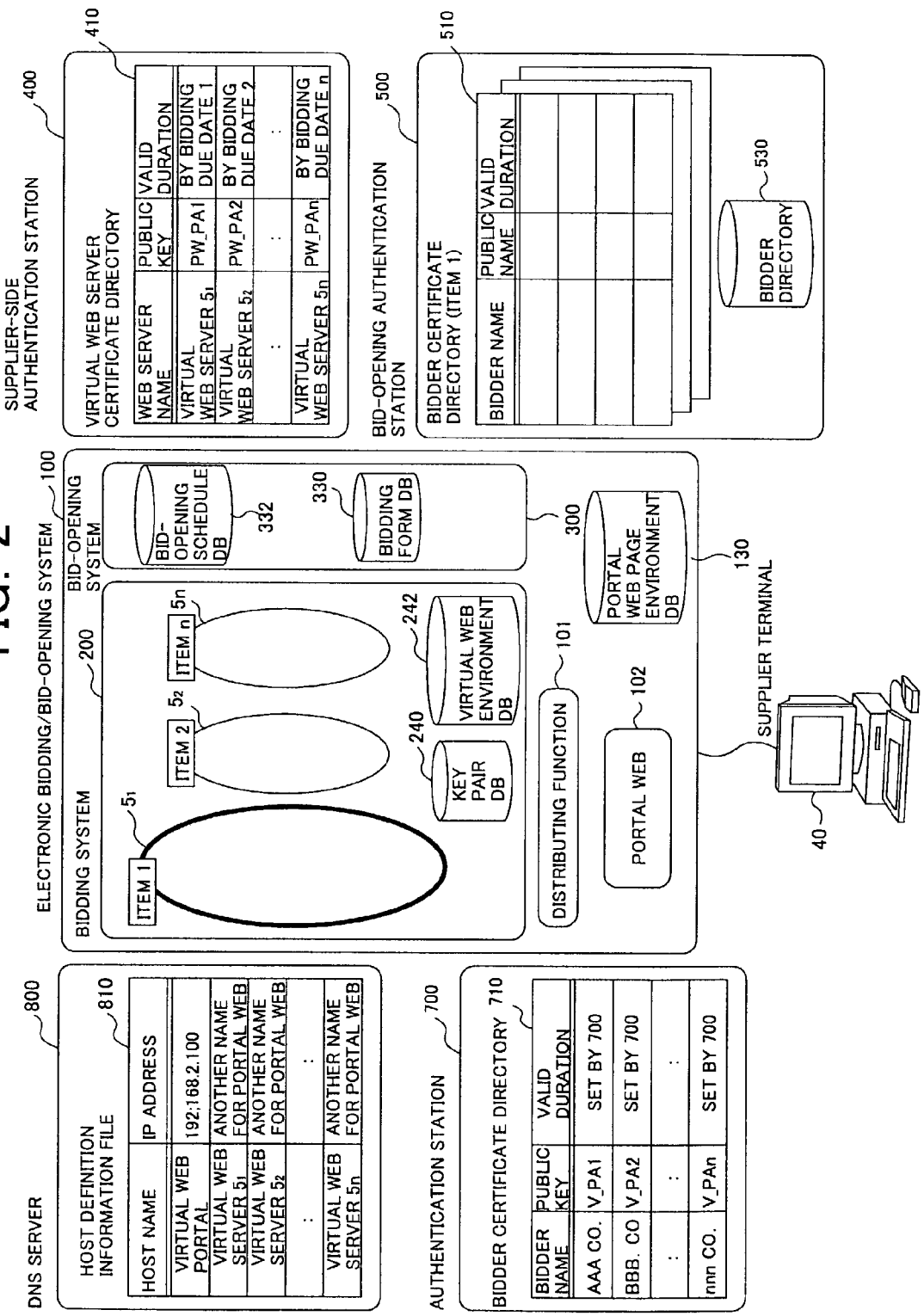
FIG. 2 is a diagram used for explaining an outline of a bid item entry process.
Figure 3:
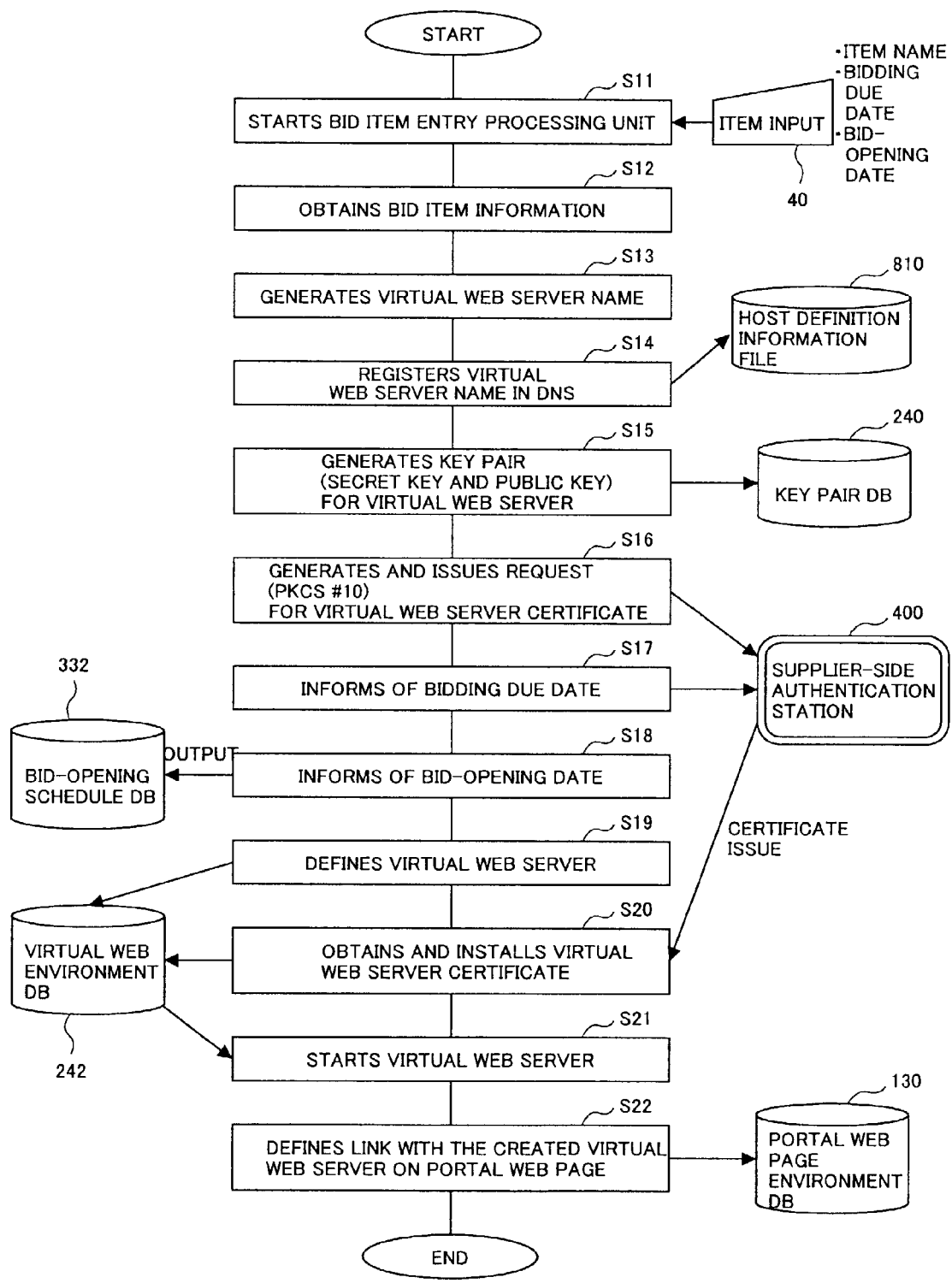
FIG. 3 is a flowchart of the bid item entry process.

Next, a description will be given, with reference to FIG. 2 and FIG. 3, of a bid item entry process performed by the bid item entry processing unit 210. FIG. 2 is a diagram used for explaining an outline of the bid item entry process. FIG. 3 is a flowchart of the bid item entry process. When a supplier inputs bid item information, such as a name of a supplied bid item, a bidding due date, and a bid-opening date, from a supplied item entry screen (hereinbelow described in detail) displayed on a supplier terminal 40 by the portal web 102 upon connecting the supplier terminal 40 to the electronic bidding/bid-opening system 100 via a network (not shown in the figure), the bidding system 200 starts the bid item entry processing unit 210 so as to commence the bid item entry process (step S11). When the bid item entry processing unit 210 receives the bid item information (step S12), the bid item entry processing unit 210 generates a server name for a virtual web (step S13). In this explanation, it is assumed that a bid item 1 is entered thereafter, and a virtual web server $5_1$ is generated for the bid item 1. Further, the bid item entry processing unit 210 registers the generated virtual web server name as another name for the portal web 102 in a DNS (Domain Name System) server 800 managing a correspondence between a host name and an IP address. Specifically, the virtual web server $5_1$ is registered in a host definition information file 810 managed by the DNS server 800 (step S14). The host definition information file 810 of the DNS server 800 is a file relating the host name and the IP address to each other, for example as shown in FIG. 2. Besides, each of the virtual web servers $5_1$ to $5_n$ may be related to a port number of the electronic bidding/bid-opening system 100.

Subsequently, the bid item entry processing unit 210 generates a key pair representing a combination of a secret key and a public key for the virtual web server $5_1$, and stores the key pair in a key pair DB (database) 240 (step S15). Further, the bid item entry processing unit 210 generates a request (e.g., a predetermined PKCS #10) requesting an issuance of a virtual web server certificate for the virtual web server $5_1$, and issues the request to the supplier-side authentication station 400 (step S16). In addition, the bid item entry processing unit 210 informs the supplier-side authentication station 400 of the bidding due date included in the bid item information received from the supplier terminal 40 (step S17).

The supplier-side authentication station 400 comprises a virtual web server certificate directory 410 (which composes virtual server securing means) managing information, such as a web server name, a generated public key, and a valid duration, as shown in FIG. 2. Upon receiving the virtual web server certificate request and the bidding due date, the supplier-side authentication station 400 records the virtual web server 5 as the web server name, records the public key (e.g., PW_PA1) obtained for the virtual web server $5_1$ as the public key, and records the noticed bidding due date (bidding due date 1) as the valid duration, in the virtual web server certificate directory 410. Thus, the supplier-side authentication station 400 sets the bidding due date imparted from the electronic bidding/bid-opening system 100 as the valid duration so as to issue the virtual web server certificate which enables a management of a bidding due date for each bid item. The supplier-side authentication station 400 issues the public key generated for the virtual web server $5_1$ and the virtual web server certificate for the virtual web server $5_1$ to the electronic bidding/bid-opening system 100.

On the other hand, the bid item entry processing unit 210 of the electronic bidding/bid-opening system 100 informs the bid-opening system 300 of the bid-opening date included in the bid item information received from the supplier terminal 40, and the bid-opening system 300 outputs the bid-opening date to a bid-opening schedule DB 332 managed by the bid-opening system 300 (step S18). Further, the bid item entry processing unit 210 stores the host definition information, which is generated in the step S13, in a virtual web environment DB 242 as definition information of the virtual web server $5_1$ (step S19).

The bid item entry processing unit 210 of the electronic bidding/bid-opening system 100 receives the virtual web server certificate for the virtual web server $5_1$ from the supplier-side authentication station 400, and stores the information regarding the virtual web server certificate in the virtual web environment DB 242 by relating the certificate information to the definition information of the virtual web server $5_1$ so as to complete an installment of the virtual web server $5_1$ (step S20). Further, the bid item entry processing unit 210 starts the installed virtual web server $5_1$ (step S21).

Subsequently, the bid item entry processing unit 210 defines a link with the created virtual web server $5_1$ on a portal web page managed by a portal web page environment DB 130 (step S22). Accordingly, thereafter, the virtual web server $5_1$ starts operating, when a plurality of bidders bid for the same bid item (the bid item 1).

At the point of completing the bid item entry process, no bidder for the bid item 1 is registered in the bid-opening authentication station 500.

Figure 4:
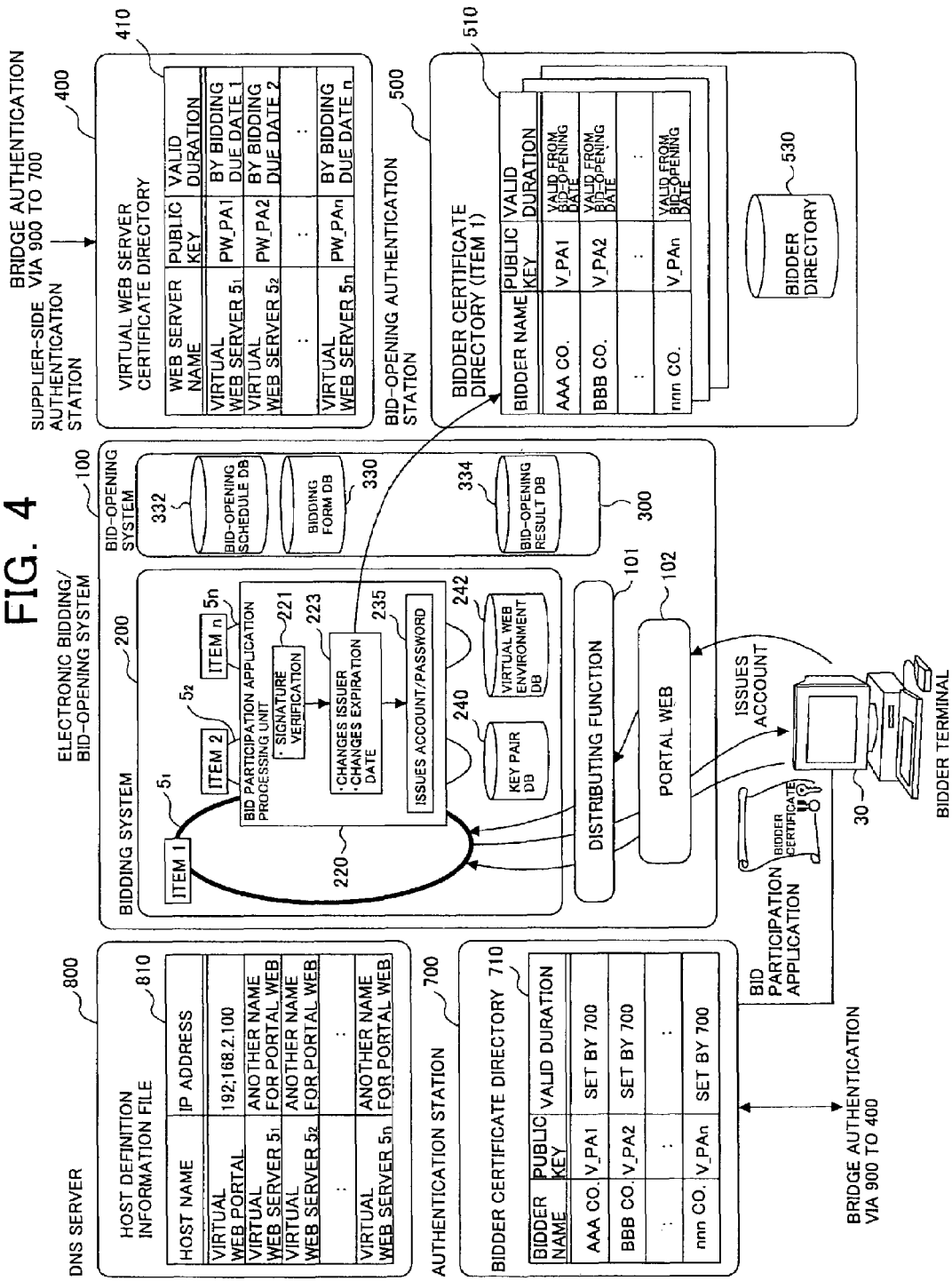
FIG. 4 is a diagram used for explaining an outline of a bid participation application process.
Figure 5:
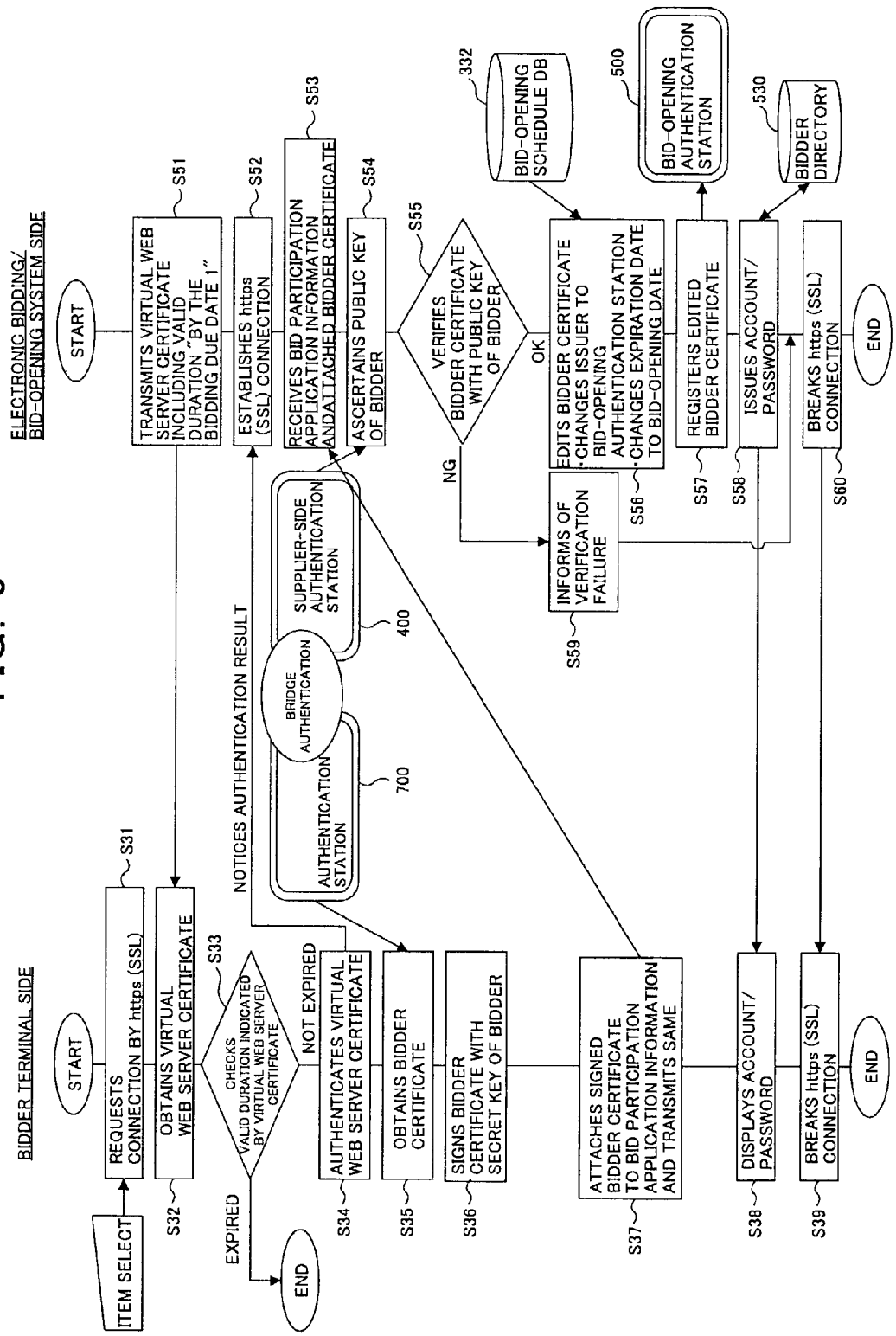
FIG. 5 is a flowchart of the bid participation application process.

Next, a description will be given, with reference to FIG. 4 and FIG. 5, of a bid participation application process performed by the bid participation application processing unit 220. FIG. 4 is a diagram used for explaining an outline of the bid participation application process. FIG. 5 is a flowchart of the bid participation application process. When a bidder selects a bid item from a bid item selection screen for bid participation (hereinbelow described in detail) displayed on the bidder terminal 30 by the portal web 102, the distributing function 101 connects to a virtual web server corresponding to the bid item selected by the bidder, and requests a connection by https (SSL) (step S31). For example, when the bidder selects the bid item 1, the distributing function 101 requests a connection by https (SSL) to the virtual web server $5_1$ corresponding to the bid item 1. In response to this connection request, the virtual web server $5_1$ in the bidding system 200 obtains the virtual web server certificate for the virtual web server $5_1$ from the supplier-side authentication station 400, and transmits the virtual web server certificate to the bidder terminal 30 (step S51). In the virtual web server certificate for the virtual web server $5_1$, "by the bidding due date 1" is set as the valid duration.

The bidder terminal 30 obtains the virtual web server certificate for the virtual web server $5_1$ from the virtual web server $5_1$ (step S32). Then, the bidder terminal 30 checks the valid duration indicated by the obtained virtual web server certificate (step S33). When the valid duration has expired, the bidder terminal 30 causes the above-mentioned connection request to be retracted, and the bid participation application process is finished. On the other hand, when the valid duration has not expired, the bidder terminal 30 authenticates the virtual web server certificate for the virtual web server $5_1$, and notifies the virtual web server $5_1$ of a result of this authentication (step S34). The virtual web server $5_1$ establishes the https (SSL) connection between the virtual web server $5_1$ and the bidder terminal 30 according to a notification of a completion of the authentication (step S52). In this course, the virtual web server $5_1$ may perform the steps of checking the valid duration. In this case, the bidder terminal 30 does not perform the step S32 and the step S33.

The bidder obtains a bidder certificate from the authentication station 700 via a network (not shown in the figure) (step S35). In this course, when the authentication station 700 receives a request for obtaining the bidder certificate from the bidder terminal 30, the authentication station 700 provides the bidder terminal 30 with the bidder certificate including information, such as a bidder name, a public key, and a valid duration determined by the authentication station 700. For example, when the bidder is AAA Company, the bidder name "AAA Company", a public key "V_PA1", and a valid duration determined by the authentication station 700, are supplied as the bidder certificate to the bidder terminal 30 via the network.

The bidder inputs bid participation application information necessary for participating in the bid, from a bid participation screen (hereinbelow described in detail) displayed on the bidder terminal 30; thereafter, the bidder signs the bidder certificate with a secret key of the bidder (step S36); then, the bidder attaches the signed bidder certificate to the above-mentioned bid participation application information, and sends the bid participation application information attached with the signed bidder certificate to the virtual web server $5_1$ (step S37).

In turn, at the side of the virtual web server $5_1$, the bid participation application processing unit 220 receives the bid participation application information and the attached bidder certificate (step S53). Additionally, the bid participation application processing unit 220 obtains the bidder certificate by the bridge authentication with the authentication station 700 via the supplier-side authentication station 400 and the bridge authentication station 900 so as to ascertain the public key of the bidder (step S54). Besides, when the bid participation application processing unit 220 simultaneously obtains, or has already obtained, the public key of the bidder, the bid participation application processing unit 220 verifies the individually obtained public key of the bidder by using the bidder certificate obtained by the bridge authentication in the step S54. The bid participation application processing unit 220 starts a signature verification unit 221 (which composes application form verifying means) so as to verify the bidder certificate with the public key of the bidder (step S55). When the verification fails (NG in the step S55), the bid participation application processing unit 220 notifies the bidder terminal 30 of the failure of the verification of the bidder (step S59), and breaks the https (SSL) connection (step S60).

On the other hand, when the verification is successful (OK in the step S55), the bid participation application processing unit 220 starts a processing unit 223 (which composes valid duration changing means) so as to edit the bidder certificate (step S56). Specifically, the processing unit 223 changes the issuer of the bidder certificate from the authentication station 700 to the bid-opening authentication station 500. Additionally, the processing unit 223 obtains the bid-opening date of the bid item 1 managed by the virtual web server $5_1$ from the bid-opening schedule DB 332, and sets the valid duration of the bidder certificate to the obtained bid-opening date. Then, the processing unit 223 registers the edited bidder certificate to a bidder certificate directory 510 (which composes bidder certificate managing means) managed by the bid-opening authentication station 500 (step S57). Specifically, in the bidder certificate directory 510, "AAA Company" is set as the bidder name; "V_PA1" determined for the bidder name "AAA Company" managed by a bidder certificate directory 710 of the third-party certification organization (the authentication station 700) is set as the public key; and "valid from the bid-opening date" based on the bid-opening date obtained from the bid-opening schedule DB 332 is set as the valid duration.

Upon completion of the edit of the bidder certificate, the bid participation application processing unit 220 notifies the bidder terminal 30 that the bid participation is accepted, and issues an account and a password for identifying the bidder by using an account/password issuing unit 235, and stores the account and the password in a bidder directory 530 managing an account and a password of each bidder (step S58). Then, the bid participation application processing unit 220 breaks the https (SSL) connection (step S60). At this point, a bid participation process performed for the bidder "AAA Company" at the side of the virtual web server $5_1$ is completed. Besides, the bidder certificate directory 510 and the bidder directory 530 may be integrated as one directory.

After transmitting the bid participation application information from the bidder terminal 30, the notification of the completion of the acceptance of the bid participation supplied from the virtual web server $5_1$, as well as the account and the password issued at the virtual web server $5_1$, are displayed on the bidder terminal 30 (step S38), and the https (SSL) connection is broken (step S39). At this point, a bid participation process performed for the bidder "AAA Company" at the bidder terminal 30 is completed.

Figure 6:
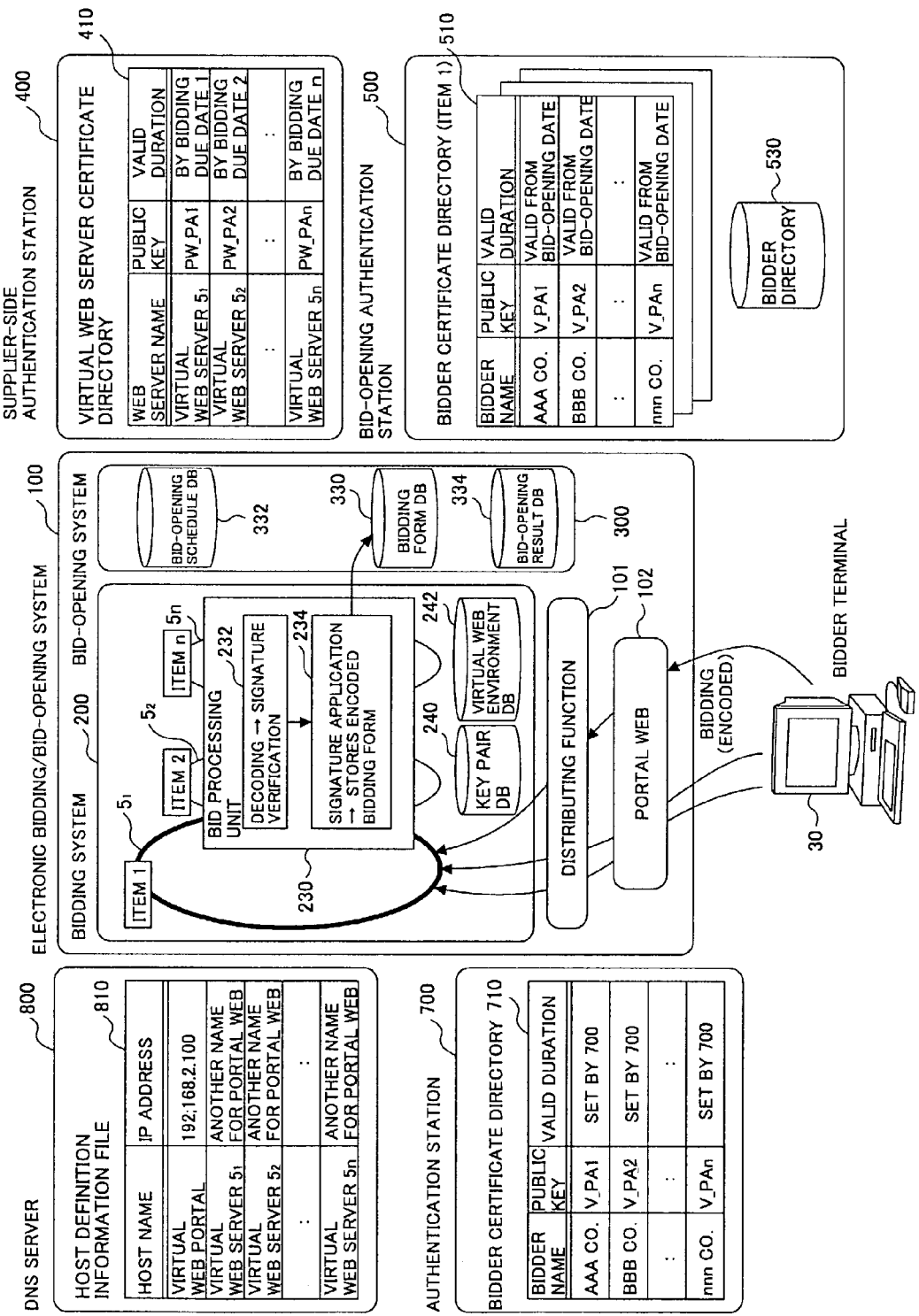
FIG. 6 is a diagram used for explaining an outline of a bid process.
Figure 7:
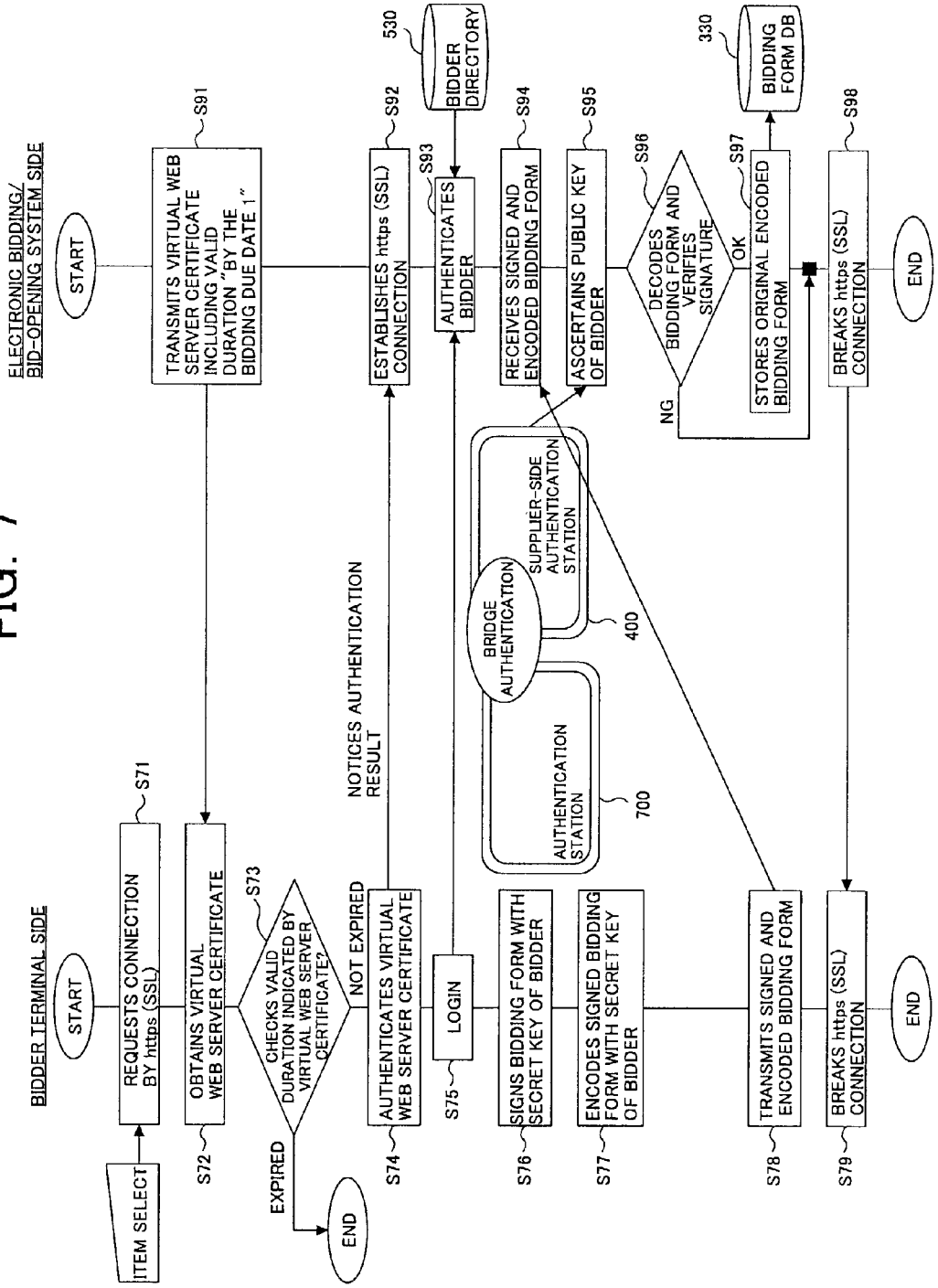
FIG. 7 is a flowchart of the bid process.

Next, a description will be given, with reference to FIG. 6 and FIG. 7, of a bid process performed by the bid processing unit 230. FIG. 6 is a diagram used for explaining an outline of the bid process. FIG. 7 is a flowchart of the bid process. When the bidder selects a bid item from a bid item selection screen for bidding (hereinbelow described in detail) displayed on the bidder terminal 30 by the portal web 102, the distributing function 101 connects to a virtual web server corresponding to the bid item selected by the bidder, and requests a connection by https (SSL) (step S71). For example, when the bidder selects the bid item 1, the distributing function 101 requests a connection by https (SSL) to the virtual web server $5_1$ corresponding to the bid item 1. In response to this connection request, the virtual web server $5_1$ in the bidding system 200 obtains the virtual web server certificate for the virtual web server $5_1$ from the supplier-side authentication station 400, and transmits the virtual web server certificate to the bidder terminal 30 (step S91). In the virtual web server certificate for the virtual web server $5_1$, "by the bidding due date 1" is set as the valid duration.

The bidder terminal 30 obtains the virtual web server certificate for the virtual web server $5_1$ from the virtual web server $5_1$ (step S72). Then, the bidder terminal 30 checks the valid duration indicated by the obtained virtual web server certificate (step S73). When the valid duration has expired, the bidder terminal 30 causes the above-mentioned connection request to be retracted, and the bid process is finished. On the other hand, when the valid duration has not expired, the bidder terminal 30 authenticates the virtual web server certificate for the virtual web server $5_1$, and notifies the virtual web server $5_1$ of a result of this authentication (step S74). The virtual web server $5_1$ establishes the https (SSL) connection between the virtual web server $5_1$ and the bidder terminal 30 according to a notification of a completion of the authentication (step S92). In this course, the virtual web server $5_1$ may perform the steps of checking the valid duration. In this case, the bidder terminal 30 does not perform the step S72 and the step S73.

After establishing the connection by https (SSL), the bidder inputs the account and the password obtained upon the bid participation application process, from a login screen displayed on the bidder terminal 30 (step S75). The virtual web server $5_1$ compares the account and the password input from the bidder terminal 30 with the account and the password of the bidder managed by the bidder directory 530 of the bid-opening authentication station 500 so as to authenticate the bidder (step S93). When the authentication fails, the virtual web server $5_1$ and the bidder terminal 30 break the https (SSL) connection, and finish the bid process.

When the authentication is successful, the bidder signs a bidding form with the secret key of the bidder by using a bidding screen (hereinbelow described in detail) displayed on the bidder terminal 30 (step S76), and further encodes the signed bidding form with the secret key of the bidder by using the bidding screen (step S77). The bidder sends the signed and encoded bidding form to the virtual web server $5_1$ (step S78).

In turn, after authenticating the bidder, the virtual web server $5_1$ receives the signed and encoded bidding form from the bidder terminal 30 (step S94); then, the virtual web server $5_1$ obtains the bidder certificate by the bridge authentication with the authentication station 700 via the supplier-side authentication station 400 and the bridge authentication station 900 so as to ascertain the public key of the bidder (step S95). Besides, when the virtual web server $5_1$ simultaneously obtains, or has already obtained, the public key of the bidder, the virtual web server $5_1$ verifies the individually obtained public key of the bidder by using the bidder certificate obtained by the bridge authentication in the step S95.

The virtual web server $5_1$ starts the bid processing unit 230 so that a processing unit 232 decodes the bidding form, and verifies the signature of the bidder applied on the bidding form, by using the public key of the bidder (step S96). When the verification fails (NG in the step S96), the virtual web server $5_1$ breaks the https (SSL) connection (step S98), and finishes the bid process. On the other hand, when the verification is successful (OK in the step S96), a processing unit 234 stores the original encoded bidding form in a bidding form DB 330 of the bid-opening system 300 (step S97). Then, the virtual web server $5_1$ breaks the https (SSL) connection (step S98), and finishes the bid process.

The bidder terminal 30 breaks the https (SSL) connection by the virtual web server $5_1$ breaking the https (SSL) connection (step S79), and finishes the bid process.

Figure 8:
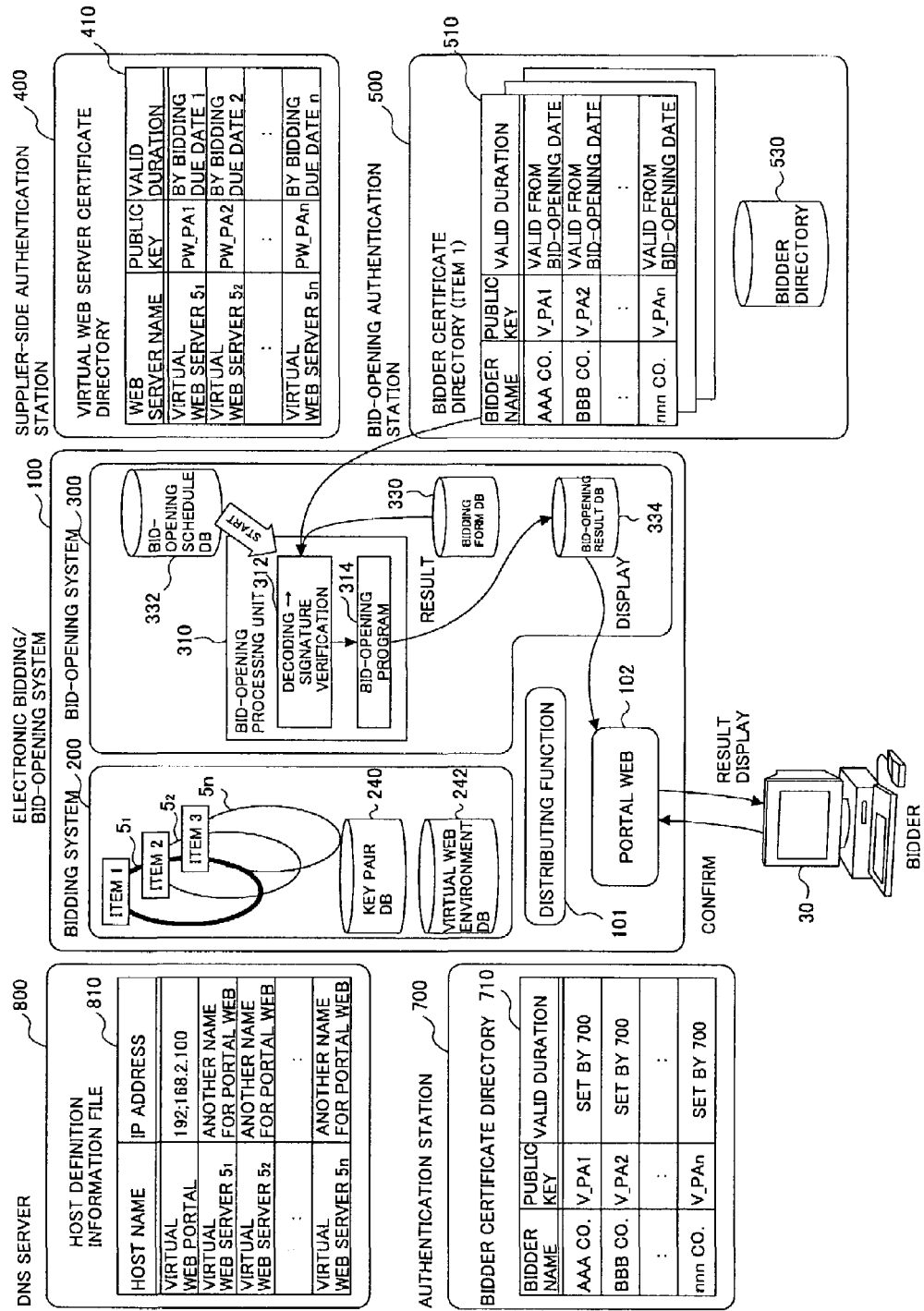
FIG. 8 is a diagram used for explaining an outline of a bid-opening process.
Figure 9:
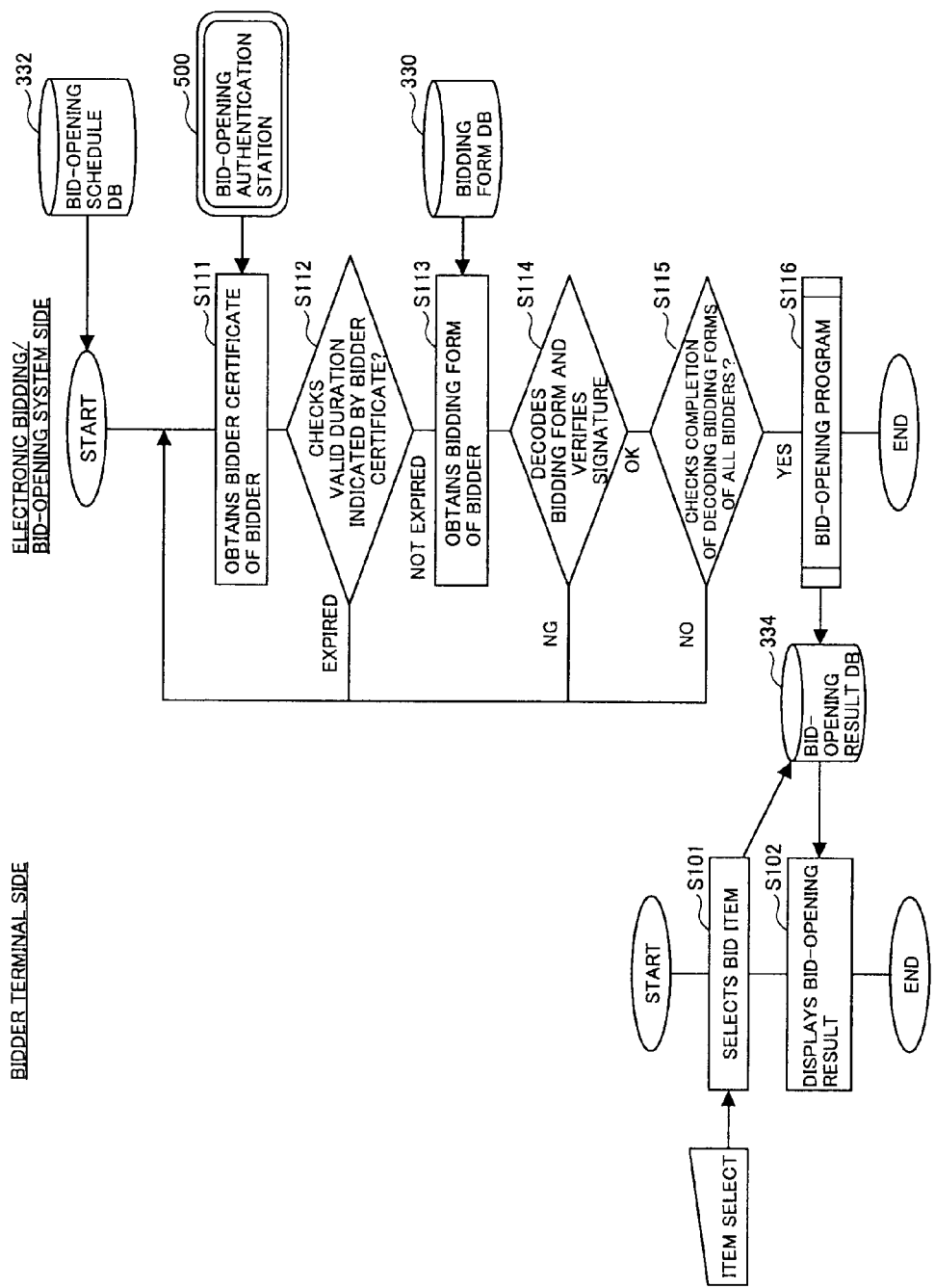
FIG. 9 is a flowchart of the bid-opening process.

Next, a description will be given, with reference to FIG. 8 and FIG. 9, of a bid-opening process performed by the bid-opening system 300. FIG. 8 is a diagram used for explaining an outline of the bid-opening process. FIG. 9 is a flowchart of the bid-opening process. When the bid-opening date managed by the bid-opening schedule DB 332 of the bid-opening system 300 comes, a bid-opening processing unit 310 is automatically started so that the bid-opening process is performed according to the flowchart shown in FIG. 9. The bid-opening processing unit 310 obtains the bidder certificate of the bid item subjected to the bid opening from the bid-opening authentication station 500, by using a processing unit 312 (step S11). For example, assuming that the bid-opening processing unit 310 is informed of the bid item 1 by the bid-opening schedule DB 332, the bid-opening processing unit 310 obtains one bidder certificate from the bidder certificate directory 510 managing the bidder certificate of the bidder bidding for the bid item 1.

The processing unit 312 checks the valid duration indicated by the obtained bidder certificate (step S112). At this point, the bid-opening date is set as the valid duration (in the above-described step S56 shown in FIG. 5). When the valid duration has expired, the processing unit 312, returning to the step S111, obtains the next bidder certificate. When the valid duration has not expired, the processing unit 312 obtains the bidding form of the bidder from the bidding form DB 330 (step S113), and decodes the bidding form with the public key of the bidder, and verifies the signature of the bidder with the public key of the bidder (step S114). When the verification fails (NG in the step S114), the processing unit 312, returning to the step S111, obtains the next bidder certificate. When the verification is successful (OK in the step S114), the processing unit 312 judges whether or not the bidding forms of all of the bidders are finished being decoded (step S115). When the bidding forms of all of the bidders are not finished being decoded (NO in the step S115), the processing unit 312, returning to the step S111, obtains the next bidder certificate. On the other hand, when the bidding forms of all of the bidders are finished being decoded (YES in the step S115), the processing unit 312 executes a bid-opening program 314, and outputs a result of the bid opening to a bid-opening result DB 334 (step S116). The bid-opening program 314 includes program code that performs a general bid-opening process. When the bid-opening result is output to the bid-opening result DB 334, the bid-opening processing unit 310 finishes the bid-opening process.

The bidder selects a bid item from a bid-opening result screen displayed on the bidder terminal 30 by the bid-opening system 300 (step S101), and is informed of bid-opening information by the bid-opening result displayed on the bidder terminal 30 (step S102).

Hereinafter, descriptions will be given of examples of the screens displayed on the bidder terminal 30 and the supplier terminal 40 by the electronic bidding/bid-opening system 100.

Figure 10:
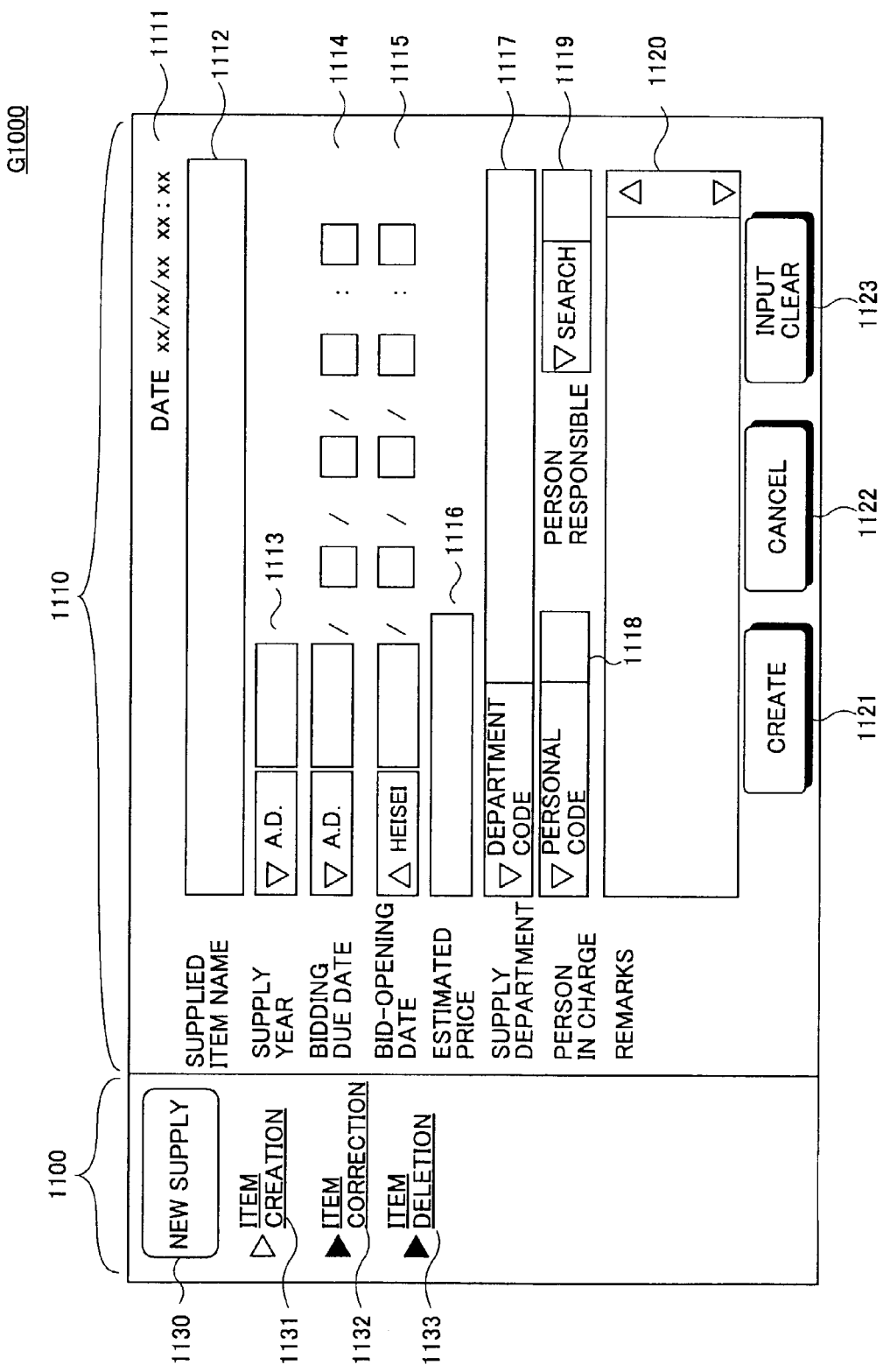
FIG. 10 is an illustration of an example of a supplied item entry screen.

FIG. 10 illustrates the supplied item entry screen (G1OOO). The supplied item entry screen G1000 is displayed on the supplier terminal 40 by the bid item entry processing unit 210 in the step S11 shown in FIG. 3. As shown in FIG. 10, the supplied item entry screen G1OOO comprises an operation field 1100 and a selected screen display field 1110 (which composes a display unit). The operation field 1100 is used for switching screens. The selected screen display field 1110 displays a screen selected in the operation field 1100. The operation field 1100 comprises a display field 1130 displaying an objective, and screen types 1131, 1132 and 1133 (which compose screen displaying means) selectable according to objectives. For example, "new supply" is displayed at the display field 1130; "item creation" (screen), "item correction" (screen) and "item deletion" (screen) are displayed at the selectable screen types 1131, 1132 and 1133, respectively. Besides, the "item creation" screen is used for creating a new item, the "item correction" screen is used for correcting the created item, and the "item deletion" screen is used for deleting the created item. For instance, when a supplier clicks the screen type 1131 by using a mouse, etc., the "item creation" screen is displayed at the selected screen display field 1110, as shown in FIG. 10.

The selected screen display field 1110 comprises a display field 1111 for displaying a current date, an input field 1112 for inputting a supplied item name, an input field 1113 for inputting a supply year, an input field 1114 for inputting a bidding due date, an input field 1115 for inputting a bid-opening date, an input field 1116 for inputting an estimated price, an input field 1117 for inputting a supply department, an input field 1118 for inputting a person in charge of the supply, an input field 1119 for inputting a person responsible for the supply, an input field 1120 for inputting a remark, a creation button 1121 used for a supplier to create a supplied item with information input in the above-mentioned input fields, a cancel button 1122 used for the supplier to cancel the input information, an input-ear button 1123 for the supplier to clear the input information for re-inputting information in the above-mentioned input fields.

Information set in the selected screen display field 1110 is output to the bid-opening schedule DB 332 as a bid-opening schedule (in the step S18 shown in FIG. 3). Further, the bidding due date input in the input field 1114 is set as the valid duration of the virtual web server certificate corresponding to the supplied item name input in the input field 1112, by the step S17 shown in FIG. 3 and the corresponding process performed by the supplier-side authentication station 400. Additionally, the bid-opening date input in the input field 1115 is set as the valid duration in the bidder certificate directory 510 corresponding to the supplied item name input in the input field 1112 (in the steps S56 and S57 shown in FIG. 5), by the processing unit 223 of the bid participation application processing unit 220 in the bid participation application process (shown in FIG. 4 and FIG. 5).

The supplier only performs the above-described settings from the supplier terminal 40; thus, thereafter, the supplier cannot use the supplier terminal 40 for the purpose of referring to information and so forth set by bidders, until the bid-opening result is output.

Figure 11:
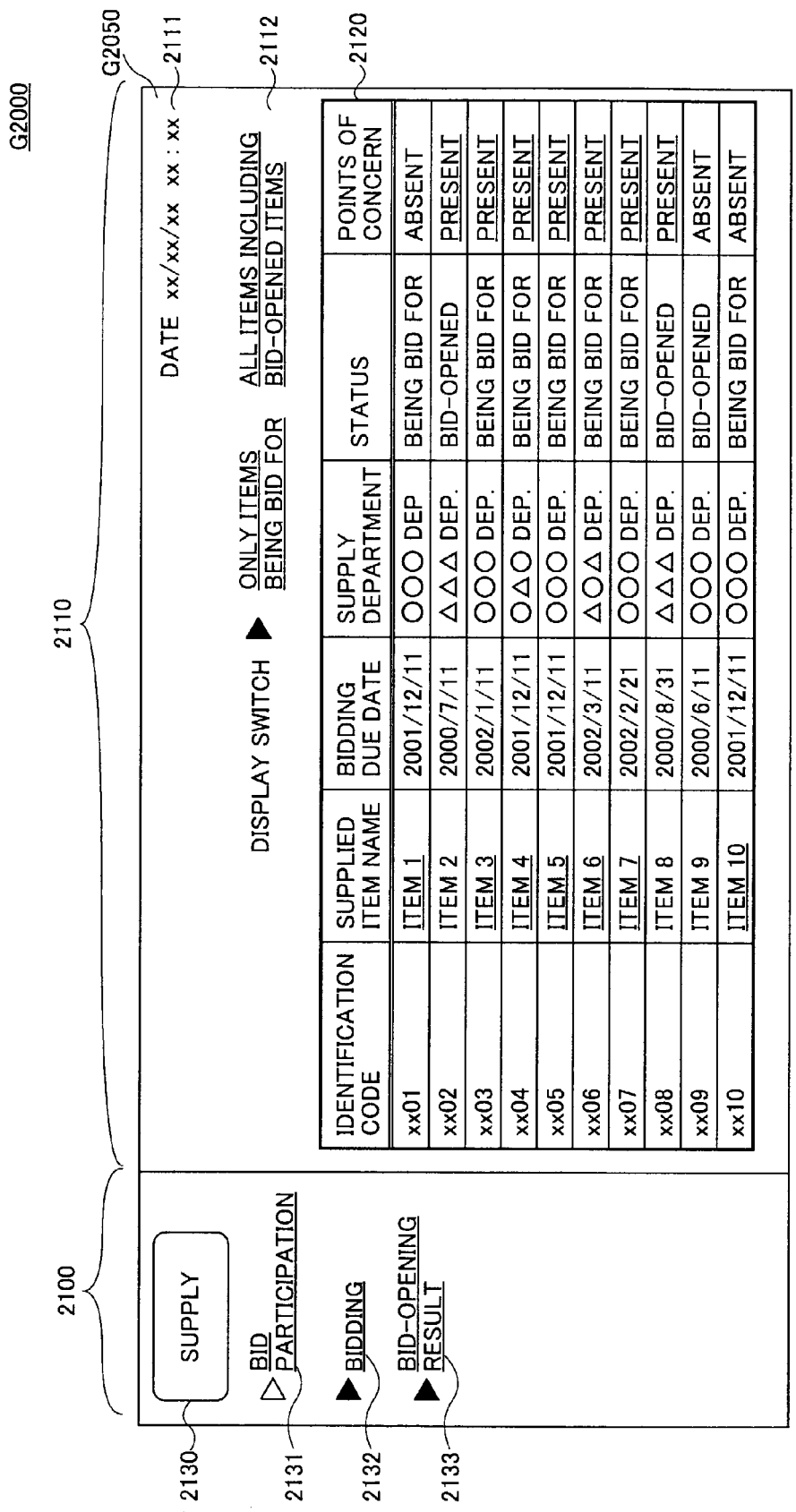
FIG. 11 is an illustration of an example of a bid item selection screen for bid participation.

FIG. 11 illustrates the bid item selection screen (G2050) for bid participation. The bid item selection screen G2050 is selectively shown, as described below, in a screen G2000 displayed on the bidder terminal 30. As shown in FIG. 11, the screen G2000 comprises an operation field 2100 and a selected screen display field 2110 (which composes a display unit). The operation field 2100 is used for switching screens. The selected screen display field 2110 displays a screen selected in the operation field 2100. The operation field 2100 comprises a display field 2130 displaying an objective, and screen types 2131, 2132 and 2133 selectable according to objectives. For example, "supply" is displayed at the display field 2130; "bid participation" (screen), "bidding" (screen) and "bid-opening result" (screen) are displayed at the selectable screen types 2131, 2132 and 2133, respectively. Besides, the "bid participation" screen is used for selecting a supplied bid item for participating in a bid for the item, the "bidding" screen is used for bidding for the selected bid item, and the "bid-opening result" screen is used for knowing a result of a bid opening after the bidding. For instance, when a bidder clicks the screen type 2131 (which composes bid participation screen displaying means) by using a mouse, etc., the bid item selection screen G2050 for the "bid participation" screen is displayed at the selected screen display field 2110, as shown in FIG. 11. The bid item selection screen G2050 shows a list of the supplied bid items.

The bid item selection screen G2050 for the "bid participation" screen comprises a display field 2111 for displaying a current date, a selection field 2112 for switching lists of the supplied bid items to be displayed, and a list display field 2120 for displaying a selected list of the supplied bid items. The selection field 2112 includes a screen item of "only items being bid for" and a screen item of "all items including bid-opened items". When the bidder clicks the screen item of "only items being bid for" by using a mouse, etc., the list display field 2120 displays a list of only the supplied bid items being bid for. When the bidder clicks the screen item of "all items including bid-opened items", the list display field 2120 displays a list of all the supplied bid items including bid-opened items. For instance, when the bidder clicks the screen item of "all items including bid-opened items", the list display field 2120 displays the list of all the supplied bid items including bid-opened items, as shown in FIG. 11.

The list display field 2120 comprises screen items, such as an identification code for identifying a supplied item, a supplied item name, a bidding due date, a supply department conducting this supply, a status indicating a current bidding status, and points of concern upon bidding. For example, the list display field 2120 indicates that a supplied item name "bid item 1" identified by an identification code "xx01" is managed by a supply department "AAA department", that a bidding due date thereof is "2000/12/11", that a current status is "being bid for", and there are no points of concern with this bidding. For further example, the list display field 2120 indicates that a supplied item name "bid item 2" identified by an identification code "xx02" is managed by a supply department "BBB department", that a bidding due date thereof is "2000/7/11", that a current status is "bid-opened", and there are points of concern with this bidding. In FIG. 11, underlined item names indicate that those items are now accepting bid participations. For example, when a bidder selects the supplied item "bid item 1" identified by the identification code "xx01", the bid participation screen (G2060) is displayed at the selected screen display field 2110, as shown in FIG. 12.

Figure 12:
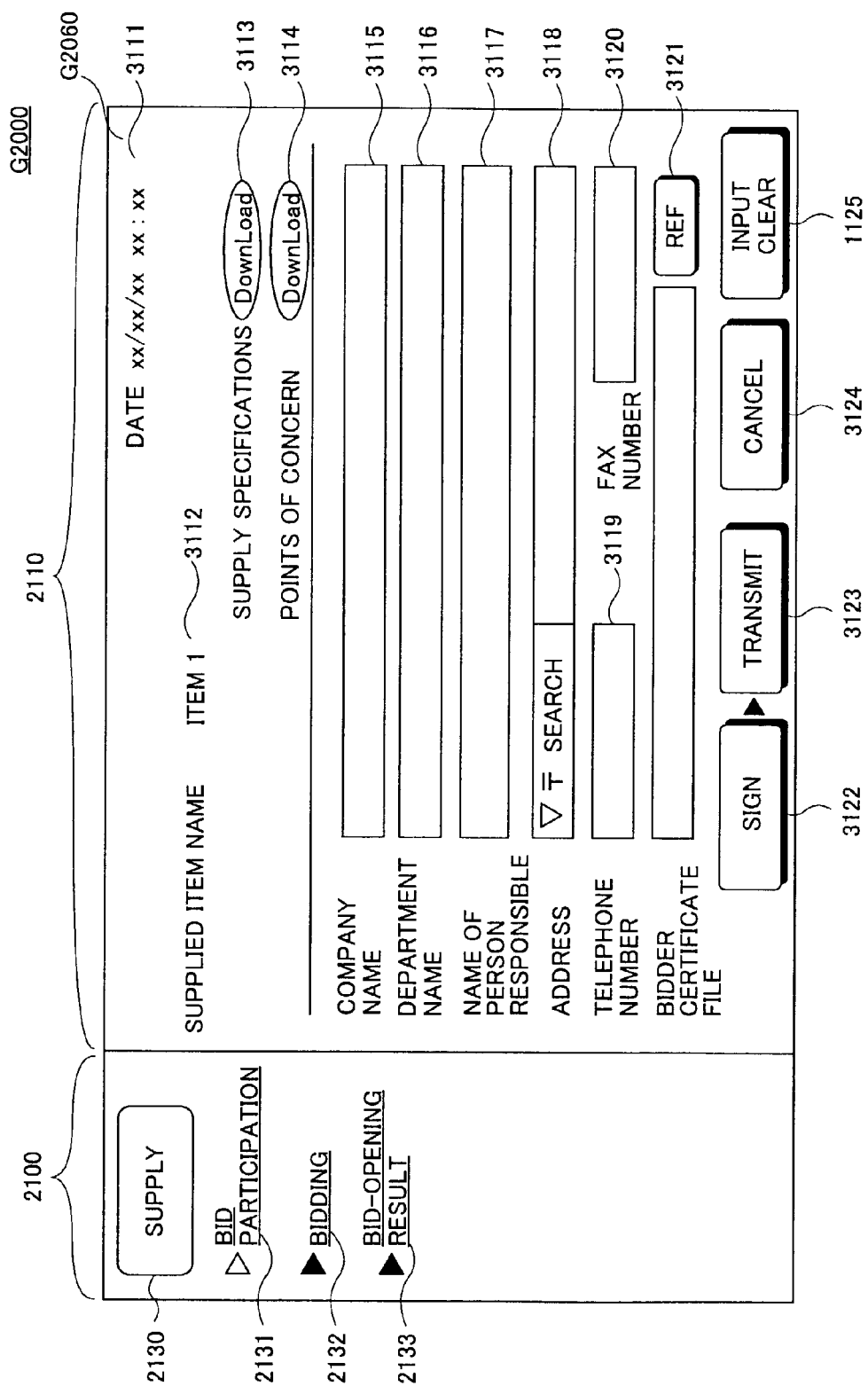
FIG. 12 is an illustration of an example of a bid participation screen for bid participation.

FIG. 12 illustrates the bid participation screen G2060 for bid participation. In FIG. 12, the screen G2000 comprises the operation field 2100 and the selected screen display field 2110, as in FIG. 11. As shown in FIG. 12, the bid participation screen G2060 comprises a display field 3111 for displaying a current date, a display field 3112 for displaying a supplied item name selected by the bidder, a button 3113 used for downloading supply specifications of the bid item 1, a button 3114 used for downloading points of concern, an input field 3115 for inputting a company name of a company to which the bidder belongs, an input field 3116 for inputting a department name of a department to which the bidder belongs, an input field 3117 for inputting a name of a person responsible for the bid, an input field 3118 for inputting an address, an input field 3119 for inputting a telephone number, an input field 3120 for inputting a fax number, and an input field 3121 for inputting a storage location at which a bidder certificate certifying the bidder issued by the authentication station 700 is stored. The bid participation screen G2060 further comprises a button 3122 (which composes first electronic signature applying means) used for signing the bidder certificate with a secret key of the bidder, a button 3123 (which composes first transmitting means) used for transmitting the signed bidder certificate, a button 3124 used for canceling the bid participation, and a button 3125 for clearing information input in the above-mentioned input fields.

By inputting information in the above-mentioned input fields, and thereafter clicking the button 3122 and the button 3123 (in the steps S36 and S37 shown in FIG. 5), the bidder can obtain an account and a password (in the step S38 shown in FIG. 5).

FIG. 13 illustrates the bid item selection screen (G2070) for bidding. In FIG. 13, the screen G2000 comprises the operation field 2100 and the selected screen display field 2110, as in FIG. 11. When the bidder selects the screen type 2132 (which composes bidding screen displaying means) in the operation field 2100 for switching to the "bidding screen", the bid item selection screen G2070 for the "bidding" screen is displayed at the selected screen display field 2110, as shown in FIG. 13. The bid item selection screen G2070 has a similar structure as the bid item selection screen G2050 shown in FIG. 11, and comprises a display field 4111 for displaying a current date, a selection field 4112 for switching lists of the supplied bid items to be displayed, and a list display field 4120 for displaying a selected list of the supplied bid items. The selection field 4112 includes a screen item of "only items being bid for" and a screen item of "all items including bid-opened items". When the bidder clicks the screen item of "only items being bid for" by using a mouse, etc., the list display field 4120 displays a list of only the supplied bid items being bid for. When the bidder clicks the screen item of "all items including bid-opened items", the list display field 4120 displays a list of all the supplied bid items including bid-opened items. For instance, when the bidder clicks the screen item of "all items including bid-opened items", the list display field 4120 displays the list of all the supplied bid items including bid-opened items, as shown in FIG. 13.

The list display field 4120 comprises screen items, such as an identification code for identifying a supplied item, a supplied item name, a bidding due date, a supply department conducting this supply, a status indicating a current bidding status, and points of concern upon bidding. In FIG. 13, underlined item names indicate that those items are now accepting bid participations. For example, when the bidder selects the supplied item "bid item 1" identified by the identification code "xx01", the login screen is first displayed, and when the account and the password input by the bidder are authenticated, the bidding screen (G2080) is displayed at the selected screen display field 2110, as shown in FIG. 14.

Figure 14:
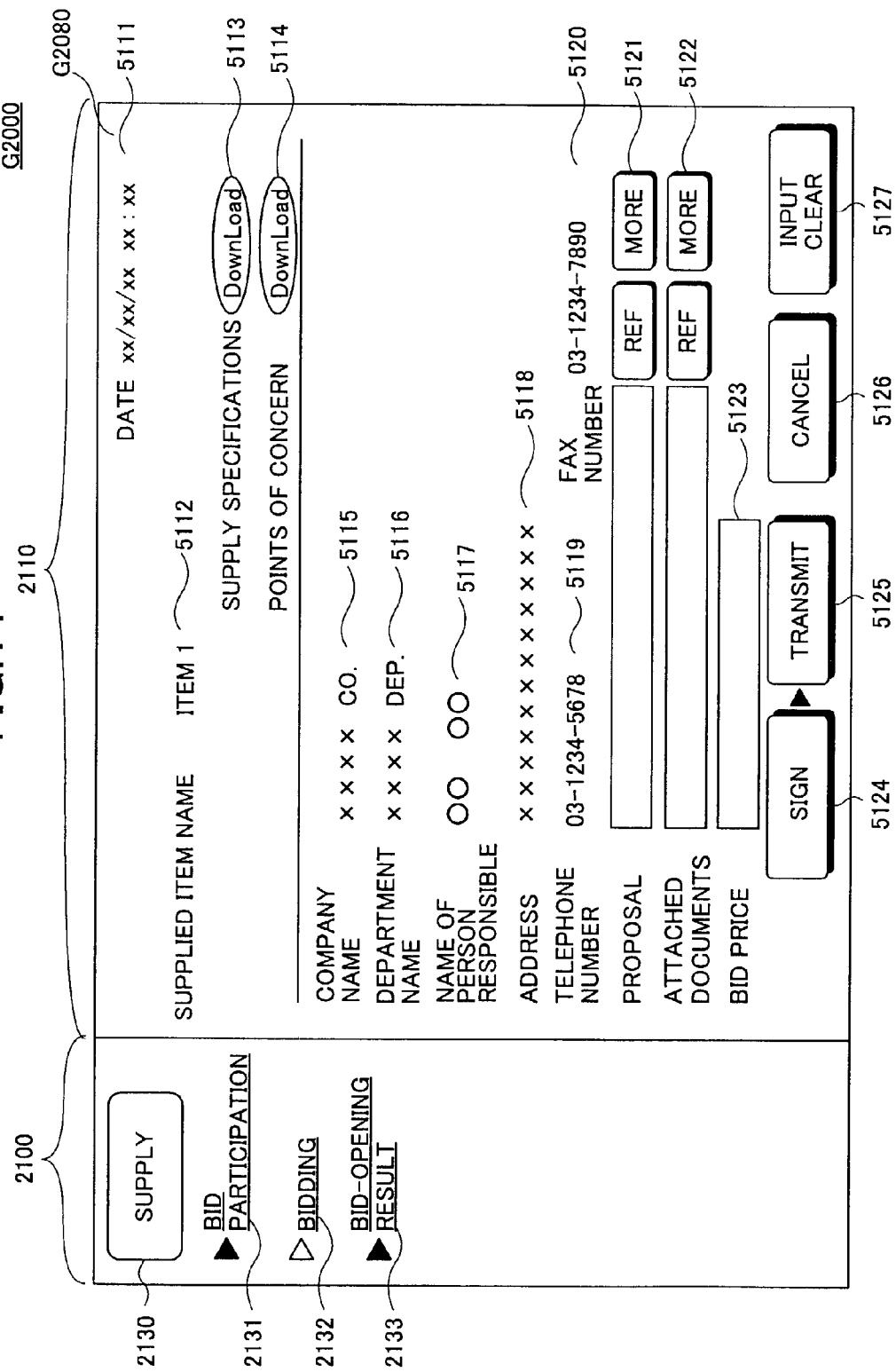
FIG. 14 is an illustration of an example of a bidding screen.

FIG. 14 illustrates the bidding screen G2080. In FIG. 14, the screen G2000 comprises the operation field 2100 and the selected screen display field 2110, as in FIG. 11. As shown in FIG. 14, the bidding screen G2080 comprises a display field 5111 for displaying a current date, a display field 5112 for displaying a supplied item name selected by the bidder, a button 5113 used for downloading supply specifications of the bid item 1, a button 5114 used for downloading points of concern, a display field 5115 for displaying the company name of the company to which the bidder belongs, a display field 5116 for displaying the department name of the department to which the bidder belongs, a display field 5117 for displaying the name of the person responsible for the bid, a display field 5118 for displaying the address, a display field 5119 for displaying the telephone number, a display field 5120 for displaying the fax number, an input field 5121 for inputting a storage location at which a proposal for the supplied bid item is stored, an input field 5122 for inputting a storage location at which attached documents are stored, and an input field 5123 for inputting a bid price. The bidding screen G2080 further comprises a button 5124 (which composes second electronic signature applying means) used for signing the proposal and the attached documents with the secret key of the bidder, a button 5125 (which composes second transmitting means) used for encoding and transmitting the signed proposal and the signed attached documents, a button 5126 used for canceling the bidding, and a button 5127 for earing information input in the above-mentioned input fields.

By inputting information in the above-mentioned input fields, and thereafter clicking the button 5122 and the button 5123 (in the steps S76 and S77 shown in FIG. 7), the signed and encoded proposal and attached documents are transmitted as a bidding form to the virtual web server $5_1$ corresponding to the bid item 1 (in the step S78 shown in FIG. 7).

The server computer forming the electronic bidding/bid-opening system 100 has a hardware configuration, for example as shown in FIG. 15.

In FIG. 15, the electronic bidding/bid-opening system 100 comprises a CPU (Central Processing Unit) 11, a memory unit 12, an output unit 13, an input unit 14, a display unit 15, an auxiliary storage unit 16, a CD-ROM drive unit 17, and a communication unit 18. These units 11 to 18 are connected to a bus B.

The CPU 11 controls the electronic bidding/bid-opening system 100 according to programs stored in the memory unit 12, and performs the bid process and the bid-opening process. The memory unit 12 comprises a RAM and a ROM, and stores the programs executed by the CPU 11, data necessary for the processes performed by the CPU 11, data obtained from the processes performed by the CPU 11, and so forth. A part of areas in the memory unit 12 is allocated as a work area used in the processes performed by the CPU 11.

The output unit 13 includes a printer and so forth, and outputs results of the processes performed by the CPU 11, or outputs designated information. The input unit 14 includes a mouse, a keyboard and so forth, and is used for inputting various types of information necessary for performing an entry for the bid process, or changing entered data, etc. The display unit 15 displays various types of information under the control of the CPU 11.

The auxiliary storage unit 16 is formed by a hard disk unit, for example, and stores various files and programs.

The programs related to the bid process and the bid-opening process are provided for the electronic bidding/bid-opening system 100 by means of a CD-ROM 20, for example. Specifically, when the CD-ROM 20 storing the programs related to the bid process and the bid-opening process is set in the CD-ROM drive unit 17, the CD-ROM drive unit 17 reads these programs from the CD-ROM 20, and the read programs are installed in the auxiliary storage unit 16 via the bus B. Then, when the bid process and the bid-opening process are initiated, the CPU 11 starts these processes according to the programs installed in the auxiliary storage unit 16. Besides, a medium storing these programs is not limited to the CD-ROM 20, but can be any computer readable medium.

The present invention is not limited to the specifically disclosed embodiments, and variations and modifications may be made without departing from the scope of the present invention.

The present application is based on Japanese priority application No. 2002-042070 filed on Feb. 19, 2002, the entire contents of which are hereby incorporated by reference.

What is claimed is:

1. An electronic bidding method for bidding for a supplied item opened via a network executed by a computer, the method comprising:

generating a virtual server by generating a virtual server name corresponding to a newly supplied item according to an entry of said supplied item by a supplier and registering the virtual server name to a host definition information file which manages a correspondence between a host name and an IP address by the computer, wherein the virtual server name corresponds to a port number;

securing said virtual server until a bidding due date of said supplied item by managing the virtual server name and the bidding due date by the computer; and enabling a bidding form transmitted from a bidder by referring to the virtual server name and the bidding due date, and managing the received bidding form by the computer, wherein said securing by the computer includes obtaining a certificate certifying said bidder from a third-party certification organization authenticating said bidder upon receiving a bid participation application form from said bidder for said supplied item, the bid participation application form to which an electronic signature is applied, the method further comprising:

verifying the electronic signature of said bidder by using a public key included in said certificate by the computer;

setting a bid-opening date of said supplied item to a valid duration of said certificate; and authenticating and managing said bidder for each supplied item until said bid-opening date by managing said certificate as a bidder certificate by the computer.

2. The electronic bidding method as claimed in claim 1, further comprising:

authenticating the bidder for the supplied item subjected to a bid opening on the bid-opening date, according to said bidder certificate managed; and performing the bid opening with respect to said bidding form transmitted from said bidder, according to a result of the authentication performed by said authenticating.

3. The electronic bidding method as claimed in claim 2, wherein said bidding form managing includes verifying the electronic signature of said bidder creating said bidding form, by using a public key included in said bidder certificate.

4. The electronic bidding method as claimed in claim 3, wherein said bidding form is an electronic document applied with an electronic signature, and said bidding form managing manages the verified signature by attaching said verified signature to said bidding form.

5. The electronic bidding method as claimed in claim 1, wherein said bidding form managing includes verifying the electronic signature of said bidder creating said bidding form, by using a public key included in said bidder certificate.

6. The electronic bidding method as claimed in claim 5, wherein said bidding form is an electronic document applied with an electronic signature, and said bidding form managing manages the verified signature by attaching said verified signature to said bidding form.

7. A computer readable recording medium storing program code readable by a computer for causing the computer to conduct a bidding for a supplied item opened via a network by executing a process comprising:

generating a virtual server by generating a virtual server name corresponding to a newly supplied item according to an entry of said supplied item by a supplier, and registering the virtual server name to a host definition information file which manages a correspondence between a host name and an IP address, wherein the virtual server name corresponds to a port number;

securing said virtual server until a bidding due date of said supplied item by managing the virtual server name and the bidding due date; and enabling a bidding form transmitted from a bidder by referring to the virtual server name and the bidding due date, and managing the received bidding form, wherein said virtual server securing includes obtaining a certificate certifying said bidder from a third-party certification organization authenticating said bidder upon receiving a bid participation application form from said bidder for said supplied item and to which an electronic signature is applied, the process further comprising:

verifying the electronic signature of said bidder by using a public key included in said certificate;

setting a bid-opening date of said supplied item to a valid duration of said certificate; and authenticating and managing said bidder for each supplied item until said bid-opening date by managing said certificate as a bidder certificate.

* * * * *

UNITED STATES PATENT AND TRADEMARK OFFICE
CERTIFICATE OF CORRECTION

| | | |
|---|---|---|
| PATENT NO. | : 7,630,920 B2 | Page 1 of 1 |
| APPLICATION NO. | : 10/268680 | |
| DATED | : December 8, 2009 | |
| INVENTOR(S) | : Akira Ishisaka | |

It is certified that error appears in the above-identified patent and that said Letters Patent is hereby corrected as shown below:

Column 15, Line 21, change "number:" to --number;--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,630,920 B2  Page 1 of 1
APPLICATION NO. : 10/268680
DATED : December 8, 2009
INVENTOR(S) : Akira Ishisaka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1733 days.

Signed and Sealed this

Second Day of November, 2010

David J. Kappos
*Director of the United States Patent and Trademark Office*